April 30, 1963 J. SCHALKWIJK 3,088,057
SIGNAL TRANSITION DETECTOR
Filed March 23, 1960
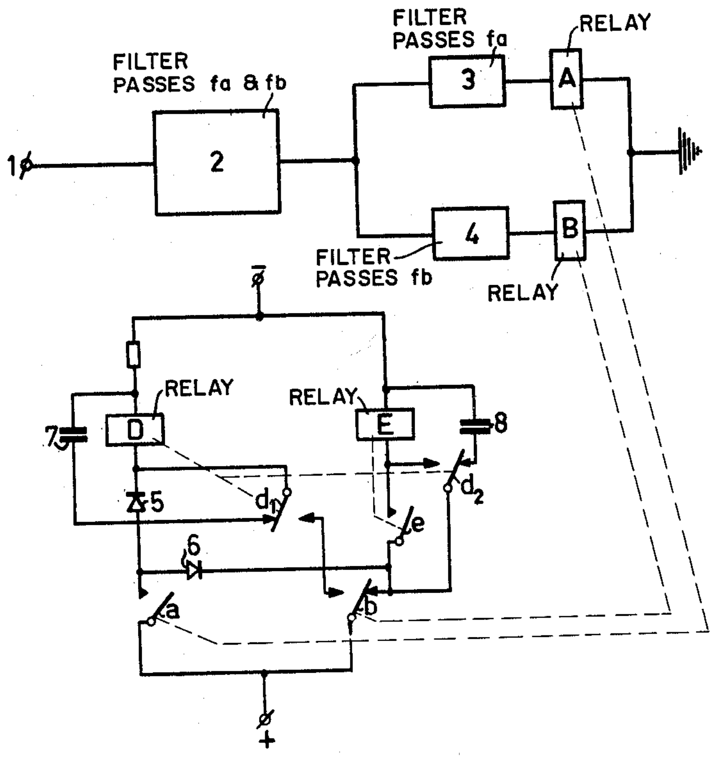
INVENTOR
JAN SCHALKWIJK
BY Frank R. Trifari
AGENT United States Patent Office 3,088,057

Patented Apr. 30, 1963

3,088,057

SIGNAL TRANSITION DETECTOR

Jan Schalkwijk, Hilversum, Netherlands, assignor to North American Philips Company, Inc., New York, N.Y., a corporation of Delaware Filed Mar. 23, 1960, Ser. No. 17,054
Claims priority, application Netherlands Mar. 25, 1959
4 Claims. (Cl. 317—138)

This invention relates to circuit arrangements for detecting with retardation two alternating current signals *a* and *b* and for detecting, substantially without retardation, very rapid transitions from the one signal to the other, and conversely, the arrangement including a band-pass filter which passes both signals and has a comparatively long building-up time, followed by two filters one of which passes only the signal *a* and the other of which passes only the signal *b*, each filter being adapted to energize a fast-acting relay. The need for such a relay is shown in co-pending patent application Serial No. 17,056, filed March 23, 1960, concerning a common telephone line. The signals are used in this common telephone line as a busy signal and as a release signal, the dialling pulses being transmitted by rapid changes of these two signals. The frequencies of the two signals have been chosen to be so close to each other that they can be produced by a generator having a tunable circuit wihtout any appreciable transients. The signal *a* may have, for example, the frequency 3100 c./s. and the signal *b* the frequency 3300 c./s. However, it must not be possible for oscillations which happen to occur in the telephone signal and have frequencies equal to those of the signals *a* and *b*, to be regarded by the circuit as the signal *a* or the signal *b*. This confusion cannot be avoided with sufficient security merely by the use of filters in the manner above described. The circuit arrangement according to the invention therefore includes, referred to as a third relay, two further relays, one of which has a first energizing circuit via a make contact of the first fast-acting relay and a second energizing circuit via a make contact of the second fast-acting relay and a make contact of the one relay itself. The other relay, referred to as a fourth relay, has a first energizing circuit via a make contact of the first fast-acting relay and a second energizing circuit via a break contact of the second fast-acting relay. The last-mentioned two energizing circuits having a common portion with a make contact of the third relay and a make contact of the fourth relay in parallel. Each of the third and fourth relays is bridged by a capacitor. The circuit of the capacitor which bridges the fourth relay includes a break contact of the third relay. Preferably, the circuit including the capacitor which bridges the third relay also includes a break contact of that third relay itself.

In order that the invention may be readily carried into effect, it will now be described in detail, by way of example, with reference to the accompanying drawing, which illustrates the circuit diagram of a signal detecting circuit according to the invention.

In the figure, reference numeral 2 indicates the filter which passes the two signals, 3 indicates the filter which passes only the signal *a* and 4 indicates the signal which passes only the signal *b*. A and B indicate the two fast-acting relays having an energization period of, for example, 1 msec. D and E indicate the two further relays and 7 and 8 indicate the capacitors bridging these relays. Relay D has a first energizing circuit via a make contact *a* of relay A and a second energizing circuit via a make contact *b* of relay B and a make contact $d_1$ of relay D itself. Relay E has a first energizing circuit via the make contact *a* of relay A and a second energizing circuit via a break contact *b* of relay B, these two energizing circuits having a common portion with a make contact *e* of relay E and a make contact $d_2$ of relay D in parallel. Relay D is bridged by capacitor 7, the circuit of this capacitor preferably including a break contact $d_1$ of relay D itself. Relay E is bridged by capacitor 8, the circuit of this capacitor including a break contact $d_2$ of relay D, which is necessary for proper operation of the circuit arrangement.

The arrangement operates as follows. If in the position of the circuit as shown the signal *b* is received, nothing else can happen than energization of the fast-acting relay B. If in this position the two signals are received, but for a duration shorter than the retardation of relay D, which may be, say, 0.5 sec., nothing else can happen than transient energization of the two fast-acting relays A and B. If, however, the signal *a* has a duration longer than 0.5 sec., the relay D is energized. The energization of relay D gives rise to non-retarded energization of relay E. This relay then remains energized via contact *e*. Consequently, the disappearance of signal *a* and its possible return do not affect the relay E. In addition, the relays D and E are in condition for rapid release as long as relay D keeps energized under which condition capacitors 7 and 8 do not shunt the windings of relays D and E.

In the case of rapid changes of the signals *a* and *b*, the relay D, once being energized, remains in the energized position since it is then energized either via contact *a* or via contact *b* and hence cannot be released provided, of course, the two signals *a* and *b* are changing substantially without transition. Relay E follows these changes substantially without retardation, since capacitor 8 is then switched off. The circuit thus detects the signal *a* with a retardation of about 0.5 sec., whilst the signal *b* can be detected with approximately the same retardation only if the arrangement has received the signal *a* some time before, but immediate changes of the signals *a* and *b* are observed substantially without retardation.

For example, if the signal *a* is received, the relays D and E will both become energized. If then the signal *a* is released without the occurrence of the signal *b*, the relay D will be released but the relay E will remain energized by way of contacts *b* and *e*. In this latter instance, capacitor 8 will be connected across the winding of relay E by way of contact $d_2$. Subsequent opening of contact *b* due to reception of signal *b* will thus result in the retarded release of relay E due to the charge on capacitor 8.

The diodes 5 and 6 serve to separate the circuits for energizing the relays D and E.

What is claimed is:

1. A circuit for detecting the occurrence of first and second signals with retardation, and for detecting rapid sequential occurrence of said signals without retardation, said circuit comprising first relay means having a first winding, first and second normally open contacts, and third normally closed contacts, a second relay means having a second winding and fourth normally open contacts, fifth normally open contacts, means responsive to said first signal for closing said fifth normally open contacts, sixth normally open and seventh normally closed contacts, means responsive to said second signal for closing said sixth normally open contacts and opening said seventh normally closed contacts, first and second parallel energization circuits connected to said first winding, said first energization circuit comprising said fifth contacts, said second energization circuit comprising said first and sixth contacts connected in series, an energization circuit connected to said second winding comprising said second and seventh contacts connected in series, means connecting said fourth contacts in parallel with said second contacts, first and second capacitor means, means connecting said first capacitor means in parallel with said first winding, and means comprising said third contacts connecting said second capacitor in parallel with said second winding.

2. The circuit of claim 1, in which said first relay means has eighth normally closed contact means, and means connecting said eighth contact means in series with said first capacitor means.

3. A circuit for detecting the occurrence of first and second signals with retardation, and for detecting rapid sequential occurrence of said signals without retardation, said circuit comprising first and second relay means, a source of an operating potential, means responsive to the occurrence of said first signal for energizing said first relay means, means responsive to the occurrence of said second signal connected in series with normally open contacts of said first relay means for holding said first relay in an energized state following energization thereof responsive to said first signal, means for energizing said second relay means in response to energization of said first relay means and the occurrence of said first signal, means for holding said second relay means energized in response to the presence of said first signal, means for de-energizing said second relay means upon the occurrence of said second signal and absence of said first signal, first and second capacitors, means connecting said first capacitor in parallel with the winding of said first relay means, and means responsive to the de-energized state of said first relay means for connecting said second capacitor in parallel with the winding of said second relay means.

4. A circuit for detecting the occurrence of first and second signals with retardation, and for detecting said sequential occurrence of said signals without retardation, said signals having different frequency values, said circuit comprising first and second frequency selective relay means respectively responsive to said first and second signals and comprising circuit make and circuit break contacts, third and fourth relay means comprising circuit make and circuit break contacts, first energization circuit means for said third relay comprising make contacts of said first relay, second energization circuit means for said third relay comprising in series relationship make contacts of said second relay and make contacts of said third relay, capacitor means connected in shunt with said third relay through break contacts of said third relay, first energization circuit means for said fourth relay comprising make contacts of said first relay, second energization circuit means for said fourth relay comprising break contacts of said second relay, parallel circuit means both interposed between said first and second energization means and said relay comprising make contacts of said third relay and make contacts of said fourth relay, and capacitor means connected in shunt with said fourth relay and said make contacts of said fourth relay through break contacts of said third relay.

References Cited in the file of this patent

UNITED STATES PATENTS 2,379,631 Finckh ---------------- July 3, 1945

2,379,631 Finckh ---------------- July 3, 1945